United States Patent
Ostrowski et al.

(10) Patent No.: US 11,148,235 B2
(45) Date of Patent: Oct. 19, 2021

(54) REPAIR OF GAS TURBINE DIAPHRAGM

(71) Applicant: General Electric Company, Schenectady, NY (US)

(72) Inventors: Andrzej Marcin Ostrowski, Laskarzew (PL); Krzysztof Dynak, Warsaw (PL); Michal Kowalczyk, Baranow (PL); Marek Miekus, Warsaw (PL); Piotr Jerzy Steckowicz, Warsaw (PL); Tomasz Michal Szewczyk, Warsaw (PL)

(73) Assignee: General Electric Company, Schenectady, NY (US)

( * ) Notice: Subject to any disclaimer, the term of this patent is extended or adjusted under 35 U.S.C. 154(b) by 59 days.

(21) Appl. No.: 16/239,824

(22) Filed: Aug. 13, 2019

(65) Prior Publication Data

US 2020/0016701 A1 Jan. 16, 2020

(30) Foreign Application Priority Data

Jan. 30, 2018 (EP) .................................... 18461510

(51) Int. Cl.
*B23P 6/00* (2006.01)
*B23K 9/04* (2006.01)
*F01D 5/00* (2006.01)

(52) U.S. Cl.
CPC ............... *B23P 6/002* (2013.01); *B23K 9/04* (2013.01); *F01D 5/005* (2013.01); *F05D 2230/80* (2013.01)

(58) Field of Classification Search
CPC .......... B23P 6/002; B23P 6/007; B23K 9/04; B23K 9/044; B23K 9/046; B23K 9/048; Y10T 29/49318; Y10T 29/49734; Y10T 29/49732; Y10T 29/49737
See application file for complete search history.

(56) References Cited

U.S. PATENT DOCUMENTS

| | | | | |
|---|---|---|---|---|
| 4,782,206 A | * | 11/1988 | Ayres ..................... | B23K 9/048 219/137 R |
| 4,924,581 A | * | 5/1990 | Jakobsen ................ | B23P 6/005 29/402.02 |
| 4,940,390 A | * | 7/1990 | Clark ..................... | B23K 9/046 416/241 R |

(Continued)

FOREIGN PATENT DOCUMENTS

| | | |
|---|---|---|
| CN | 102935545 A | 2/2013 |
| JP | 2005095905 A | 4/2005 |

OTHER PUBLICATIONS

European Search Repod issued in connection with corresponding EP application No. 18461510.2 dated Jul. 12, 2018.

*Primary Examiner* — Jason L Vaughan
(74) *Attorney, Agent, or Firm* — James Pemrick; Hoffman Warnick LLC

(57) ABSTRACT

A method of refurbishing worn diaphragm rails for turbo machines. This method comprises machining the worn part of the diaphragm rails such that a clean and geometrically exact machined surface is achieved. Welding one or more layers on these machined surfaces builds up a cladding that overtops the nominal dimensions of new diaphragm. The method further comprises machining the cladding such that it has the nominal dimensions of a new diaphragm.

14 Claims, 11 Drawing Sheets

(56) References Cited

U.S. PATENT DOCUMENTS

| | | | | |
|---|---|---|---|---|
| 5,233,150 | A * | 8/1993 | Schneebeli | B23K 9/046 219/76.14 |
| 5,591,363 | A * | 1/1997 | Amos | B23K 9/046 219/137 PS |
| 5,697,151 | A * | 12/1997 | Werner | B23P 6/005 29/402.18 |
| 5,794,338 | A * | 8/1998 | Bowden, Jr. | B23P 6/007 29/402.09 |
| 6,118,098 | A * | 9/2000 | Amos | F01D 5/005 219/137 R |
| 6,568,077 | B1 * | 5/2003 | Hellemann | B23K 15/0086 29/889.1 |
| 7,985,046 | B2 * | 7/2011 | Gaul | B23P 6/005 415/209.2 |
| 9,068,459 | B2 | 6/2015 | Sassatelli et al. | |
| 9,303,515 | B2 | 4/2016 | Singh et al. | |
| 9,868,180 | B2 * | 1/2018 | Henderson | B23K 26/34 |
| 10,478,921 | B2 * | 11/2019 | Arjakine | F01D 5/12 |
| 2007/0163115 | A1 * | 7/2007 | Cheng | F01D 5/005 29/889.2 |
| 2010/0290902 | A1 | 11/2010 | Gaul et al. | |
| 2012/0094144 | A1 * | 4/2012 | Kamimura | F01D 5/286 428/615 |
| 2014/0064954 | A1 | 3/2014 | Singh et al. | |
| 2014/0217068 | A1 | 8/2014 | Jean-Baptiste | |
| 2015/0322791 | A1 * | 11/2015 | Flach | F04D 29/18 416/223 R |
| 2016/0045982 | A1 * | 2/2016 | Stoodt | F01D 5/005 29/889.1 |
| 2019/0275611 | A1 * | 9/2019 | Mangano | B23P 6/007 |

* cited by examiner

REPAIR OF GAS TURBINE DIAPHRAGM

BACKGROUND OF THE INVENTION

The subject matter disclosed herein relates to the art of turbomachines and, more particularly, to a turbomachine diaphragm and a method of repairing a turbomachine diaphragm.

In a turbomachine, air is passed into an inlet of a compressor. The air is passed through various stages of the compressor to form a compressed airflow. A portion of the compressed airflow is passed to a combustion assembly and another portion of the compressed airflow is passed to a turbine portion and used for cooling. In the combustion assembly, the compressed airflow is mixed with fuel and combusted to form a high temperature gas stream and exhaust gases. The high temperature gas stream is channeled to the turbine portion via a transition piece. The transition piece guides the high temperature gas stream toward a hot gas path of the turbine portion. The high temperature gas stream expands through various stages of the turbine portion converting thermal energy to mechanical energy that rotates a turbine shaft. The turbine portion may be used in a variety of applications including providing power to a pump, an electrical generator, a vehicle, or the like.

From U.S. Pat. No. 9,303,512 B2 a method for repairing a turbomachine diaphragm is known. It includes removing a worn area from a diaphragm rail member by machining and forming a repair coupon mounting element in the diaphragm rail member. Further a repair coupon is machined and bonded to the machined surface at the repair coupon mounting element.

In US 2010/0290902 A1 a technique for refurbishing nozzle diaphragm sections of a gas turbine is described. This technique replaces an eroded or worn section of the nozzle diaphragm with a replacement part designed to be positively locked in a slot machined in the nozzle diaphragm. The replacement part is formed of a material having a similar coefficient of expansion as the material used for manufacturing the original nozzle diaphragm. The combination of the nozzle diaphragm and the replacement part conform to the original manufacturer's dimensional specifications for the nozzle diaphragm.

BRIEF DESCRIPTION OF THE INVENTION

It is an object of the invention to further improve and enhance the possibilities of repairing a turbomachine diaphragm. Further it is an object of the invention that the repaired diaphragm has improved abilities and extended service life compared to a new diaphragm.

These objects are achieved using a method of repairing a turbomachine diaphragm according to claim 1.

The claimed method is rather efficient since it comprises only three steps. The first and second step consist of machining the worn or eroded coupon of the diaphragm rail such that a clean, not corroded and geometrically exact machined surface is generated. Of course, the machined surface has reduced dimensions compared to the nominal dimensions of the diaphragm rail member. The difference in size between the machined surface and the nominal dimensions of a new diaphragm are filled by a filler material, which forms the claimed cladding (third step).

The claimed method has been successfully executed repairing diaphragm cast of a nickel iron alloy, so-called Ni-resist, and a cladding consisting of a filler material from austenitic stainless steel, such as LS 309LSI, 300 series fillers and 312. The claimed method is flexible since only the worn parts of the diaphragm rail member are machined and cladded. Those parts of the rail member that are not worn or eroded, need not be cladded. This means that solely the worn parts of the diaphragm are repaired, reducing costs for machining and cladding of the diaphragm.

In case the distance between the machined surfaces and the nominal dimensions of the diaphragm are greater than the thickness of one layer of the cladding, several layers up to ten or even more layers can be welded to the machined surface of the diaphragm such that the whole affected feature or coupon is being restored. At the end of the welding process the surface of the cladding overtops the nominal dimensions of a new diaphragm. The last step of the claimed method consists of machining the cladding to the nominal dimensions of a new diaphragm according to the manufacturer's specification. Machining may be a milling process or any other suitable process.

In a further advantageous embodiment each welding layer includes several weld passes welded in close proximity to each other such that a compact cladding is achieved.

The claimed method may be further improved if the main welding parameters, such as weld speed, current and voltage, wire speed, and other parameters, well-known to the man skilled in the art, are adapted accordingly. It is possible to adapt these parameters for each pass of a layer, each layer or only once for welding a complete cladding.

To avoid or at least reduce mechanical stress due to the welding process it is preferred that in case the machined surfaces have a symmetric cross-sectional area the passes are welded alternating on each side of the axis of symmetry.

It has been proven advantageous if the welding process is a MIG/MAG-process. Further, it has been proven advantageous if the welding process is supported by an inert gas, wherein the inert gas consists of more than 90% argon and the rest $CO_2$. A TIG process may also be used for the repair process however different parameters are used in this case.

After the welding process is finished, the claimed method comprises the step of machining the cladding until it has the nominal dimensions of a new diaphragm according to the manufacturer's specification.

The above-mentioned objects are also achieved using a turbine machined diaphragm according to one of the claims 11 to 13.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
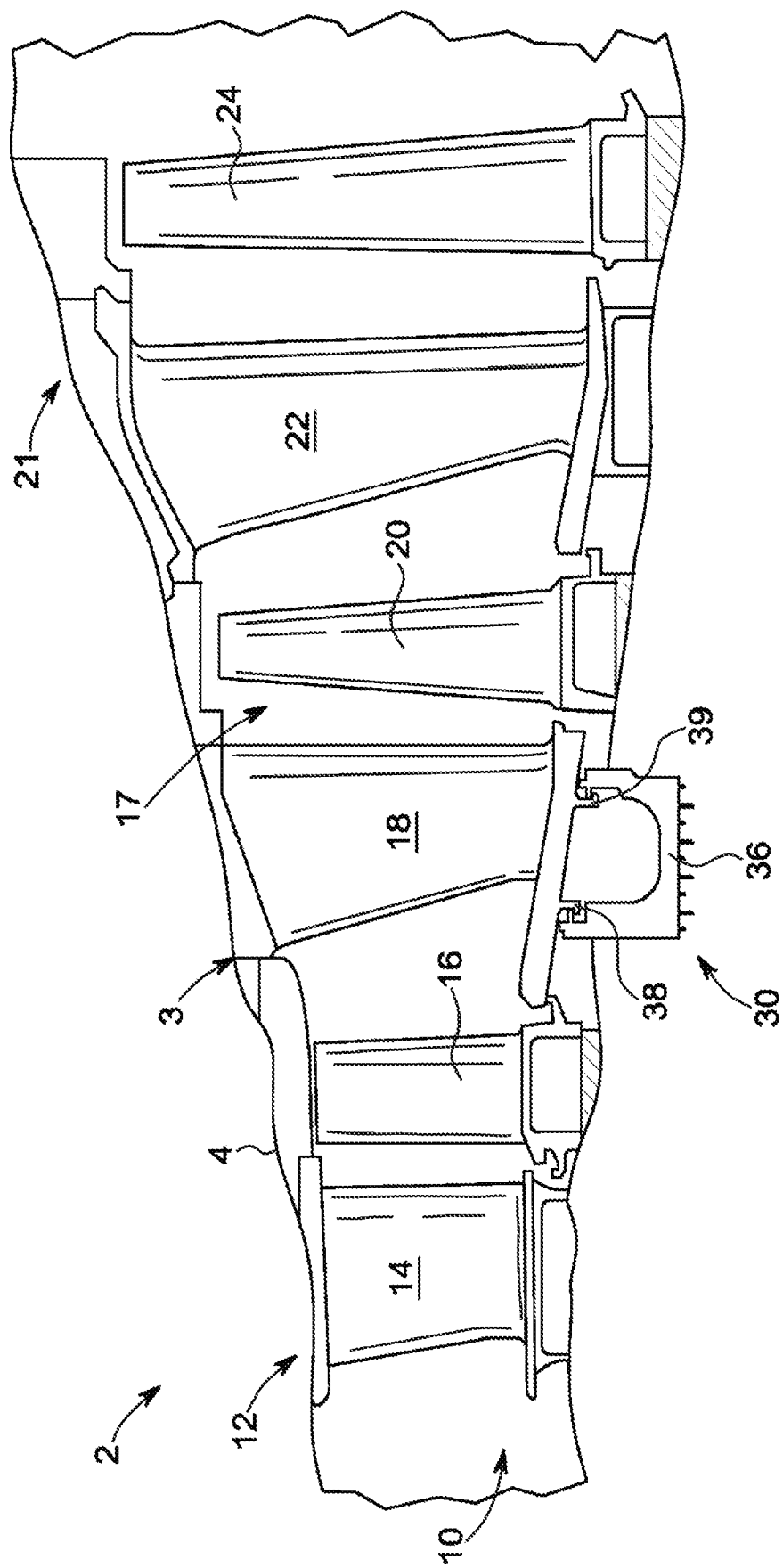
FIG. 1 is a schematic view of a turbomachine including a diaphragm in accordance with an exemplary embodiment.

Referring to FIG. 1, a turbomachine, in accordance with an exemplary embodiment, is indicated generally at 2. Turbomachine 2 includes a turbine portion 3 having a housing 4 that defines, at least in part, a hot gas path 10. Turbine portion 3 includes a first stage 12, having a plurality of first stage vanes or nozzles 14, and first stage buckets or blades 16; a second stage 17 having a plurality of second stage vanes or nozzles 18 and second stage buckets or blades 20; and a third stage 21 having a plurality of third stage vanes or nozzles 22 and third stage buckets or blades 24. Of course it should be understood that turbine portion 3 could also include additional stages (not shown).

Hot combustion gases flow axially along hot gas path 10 through nozzles 14, 18, and 22, impact and rotate blades 16, 20, and 24. In addition, a cooling airflow is guided into a wheelspace (not separately labeled) of turbine portion 3. The cooling airflow, typically from a compressor portion (not shown) is directed through various components of turbine portion 3 to reduce localized hot spots, improve wear, and increase an overall component life. Each nozzle 14, 18, and 22 includes a corresponding diaphragm, one of which is shown at 30, that provides a seal which prevents hot gases from passing from hot gas path 10 into the wheelspace. Diaphragm 30 cooperates with additional structure, (not shown), to limit ingestion of hot gases into the wheelspace. Loss of hot gases from hot gas path 10 into the wheelspace reduces operational efficiency of turbine portion 3. Over time, portions of diaphragm 30 may become worn and require localized repair as will be discussed more fully below.

Figure 2:
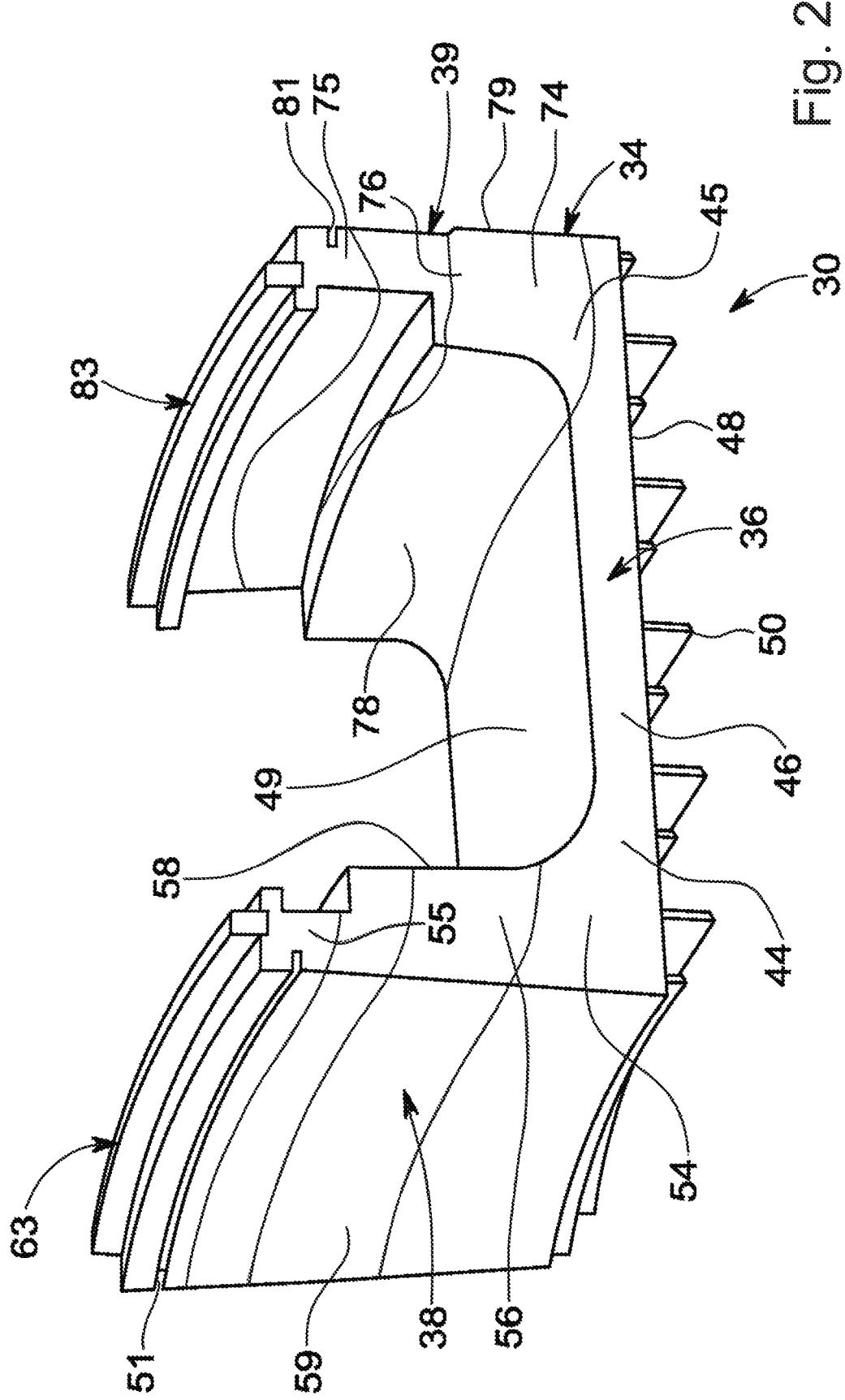
FIG. 2 is a perspective view of a new diaphragm.

Reference will now follow to FIG. 2 in describing a new, not worn diaphragm 30. Diaphragm 30 is often cast from nickel-iron alloy and includes a body 34 having a sealing section 36, a first rail member 38 and a second rail member 39. Sealing section 36 includes a first end portion 44 that extends to a second end portion 45 through an intermediate portion 46 that defines an outer surface portion 48 and an inner surface portion 49. Outer surface portion 48 is provided with a plurality of seal elements 50 that cooperate with additional structure (not shown) arranged in the wheel space of turbine portion 3. First rail member 38 extends from first end portion 44 and second rail member 39 extends from second end portion 45. First rail member 38 includes a first end section 54 that extends to a second end section 55 through an intermediate section 56 that defines an inner surface section 58 and an outer surface section 59. Outer surface section 59 includes a discourager seal mounting section 51 that supports a discourager seal (not separately labeled). Second end section 55 supports a coupon 63 being an integral part of the first rail member 38.

Similarly, second rail member 39 includes a first end section 74 that extends to a second end section 75 through an intermediate section 76 that defines an inner surface section 78 and an outer surface section 79. Outer surface section 79 includes a discourager seal mounting section 81 that supports a discourager seal (not separately labeled). Second end section 75 supports a coupon 83 being an integral part of the second rail member 39. Over time the original coupons 63, 83 wear. Worn coupons 63, 83 may allow hot gasses to flow from hot gas path 10 into the wheel space or other regions of the turbomachine. The loss of gases from the hot gas path 10 reduces turbine efficiency. Accordingly, diaphragms 30 are either repaired or replaced during a maintenance interval. In accordance with the exemplary embodiment, instead of a labor intensive repair of the original coupon, the exemplary embodiment discloses various techniques for replacing the original coupon with a repair coupon.

Figure 3:
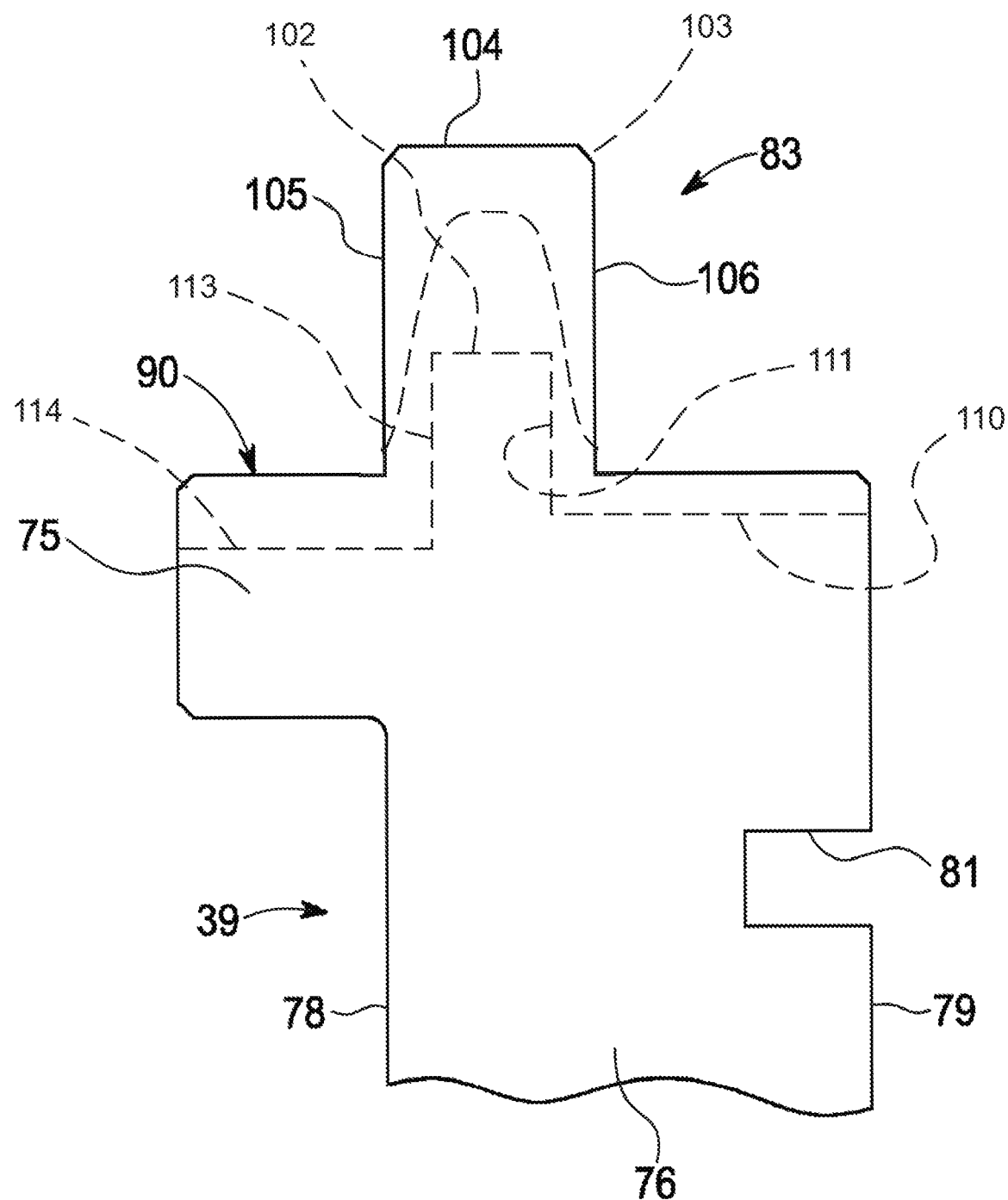
FIG. 3 is a partial plan view of a diaphragm rail showing an exemplary contour of a worn diaphragm rail.

Reference will now be made to FIG. 3 illustrating in more detail the contour of the coupon 83 with an understanding that coupon 63 has a rather similar contour.

Second end section 75 includes a surface 90 and the coupon 83. The surface 90, the coupon 83 and a discourager seal mounting section 81 among others constitute the main dimensions of the second rail member 39.

More specifically, coupon 83 includes an end 104 joined by first and second opposing sides 105 and 106 forming a substantially rectangular cross-sectional area defined by 104, 104 and 106. This cross-sectional area complies with the nominal dimensions of a new diaphragm 30 according to the manufacturer's specification.

A hatched line 103 illustrates an exemplary contour of a worn diaphragm 30. By comparing the cross-sectional area and the cross-sectional area 103 of a worn diaphragm 30, it becomes apparent that due to the reduced contour 103 of a worn diaphragm 30 the loss of hot gases increases significantly and repair of the diaphragm 30 is required.

Before cladding the worn part(s) of the diaphragm 30 the worn part(s) have to be removed in part such that the claimed welding process start on a clean machined surface of the diaphragm 30. The at least on machined surface can be manufactured for example by milling or the like.

In the embodiment illustrated in FIG. 3 there are five (5) machined surfaces 110, 111, 112, 113 and 114. As can be seen by the comparison of the machined surfaces 110 to 114 and the cross-sectional area of a new diaphragm 30 according to manufacturer's specification (c. f. the reference numerals 90, 104, 105 and 106) it can be seen that the contour of the machined surfaces 110 to 114 is smaller than the contour of a new diaphragm. The volume between the machined surfaces 110 to 114 and nominal dimensions (c. f. 90, 104, 105 and 106) are filled by a filler material.

Welding this filler material to the machined surfaces 110 to 114 creates a compact cladding comprising one or more layers which fills the a. m. volume. Of course, the cladding has to overtop the contour of a new diaphragm 30 since welding is a process that does not produce geometrically exact surfaces. This means that a part of the cladding has to be machined after the cladding process to bring the cladding in conformity with the nominal dimensions following the surface 90, the sides 105 and 106 as well as the end 104 of a new diaphragm 30.

Figure 4:
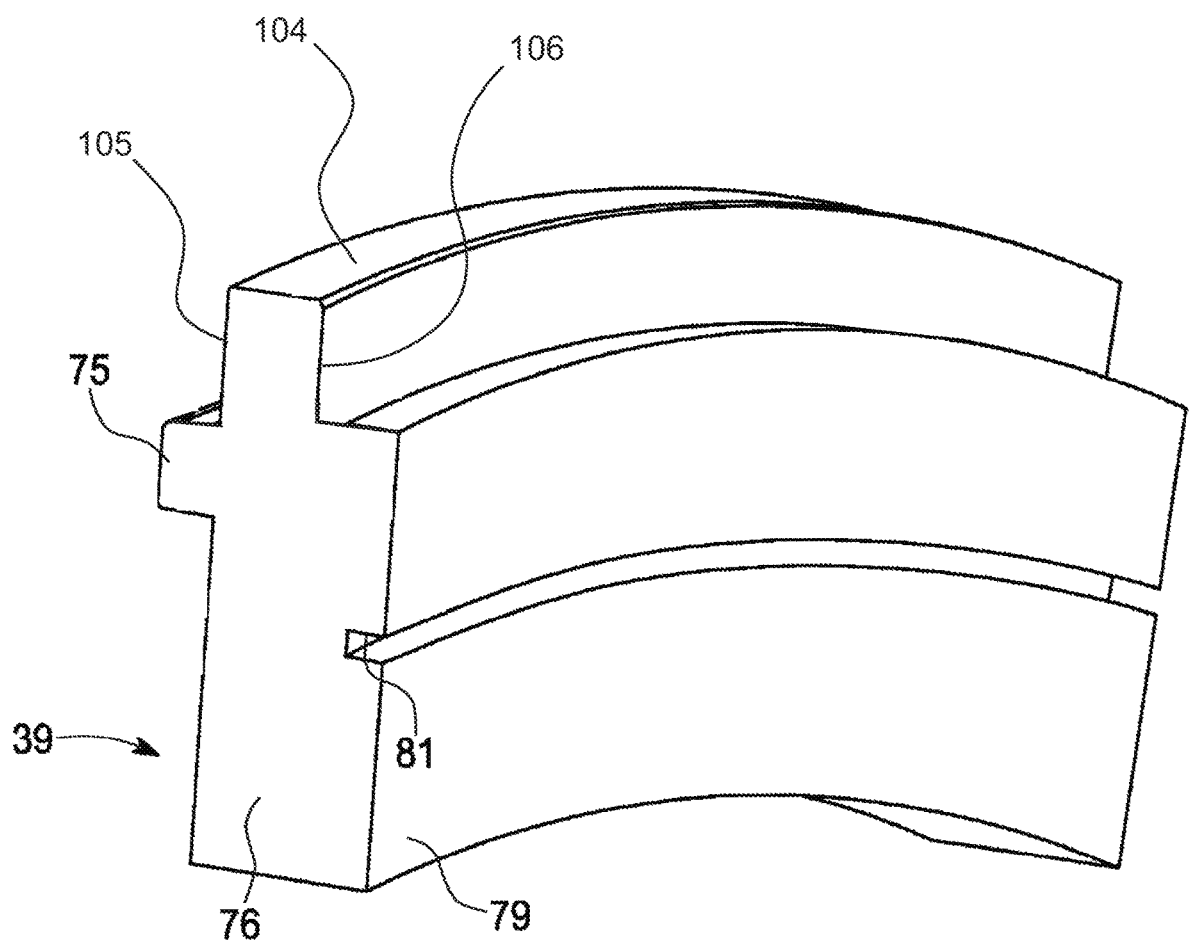
FIG. 4 is a partial plan view of a new or repaired diaphragm rail member.

FIG. 4, wherein like reference numbers represent corresponding parts in the respective views, illustrates a perspective view of the second rail member 39.

Figure 5:
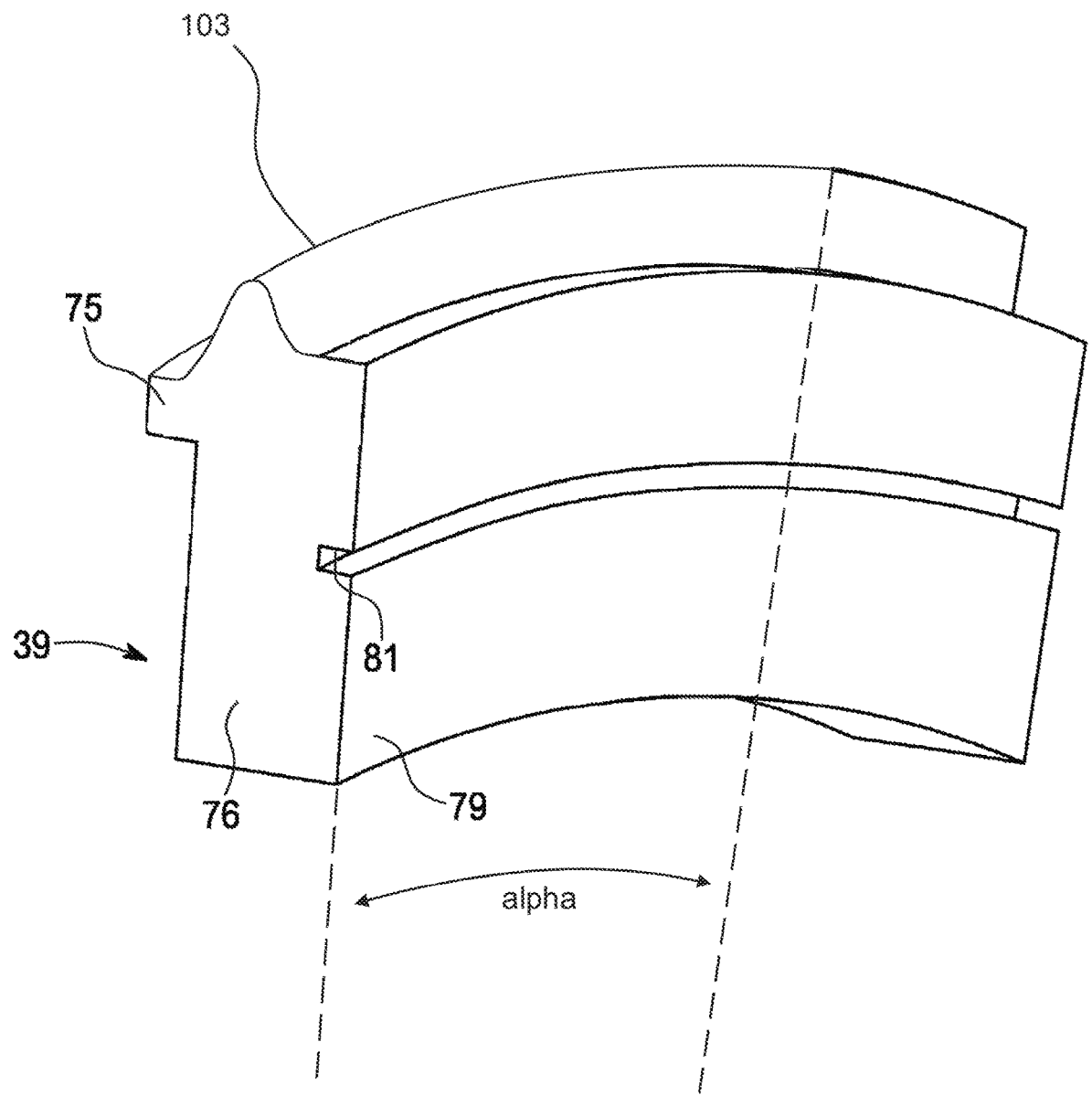
FIG. 5 is a partial plan view of the diaphragm of FIG. 4 being partially worn.

FIG. 5, wherein like reference numbers represent corresponding parts in the respective views, illustrates a perspective view of the contour 103 of the second rail member 39 that is worn over an angle alpha in a tangential direction.

The angle alpha illustrates the length of the worn part of a diaphragm rail member 39. Of course, only the worn parts of the diaphragm have to be repaired. It is in most cases not necessary to machine the diaphragm rail member 39 over its entire length. This reduces the machining time and further reduces the time and expenses for welding a cladding on the machined surfaces.

Of course, if necessary it is possible to machine the diaphragm over the entire length of its rail members 38, 39 and weld a cladding over the entire length of the rail member 38, 39. This is necessary, if the whole rail member is worn or if the material of the diaphragm that is exposed to the hot gases should be replaced by a cladding material that better withstands the hot gases, such as austenitic stainless steel compared to cast nickel iron, which is in most cases the material of the diaphragm 30.

Figure 6A:
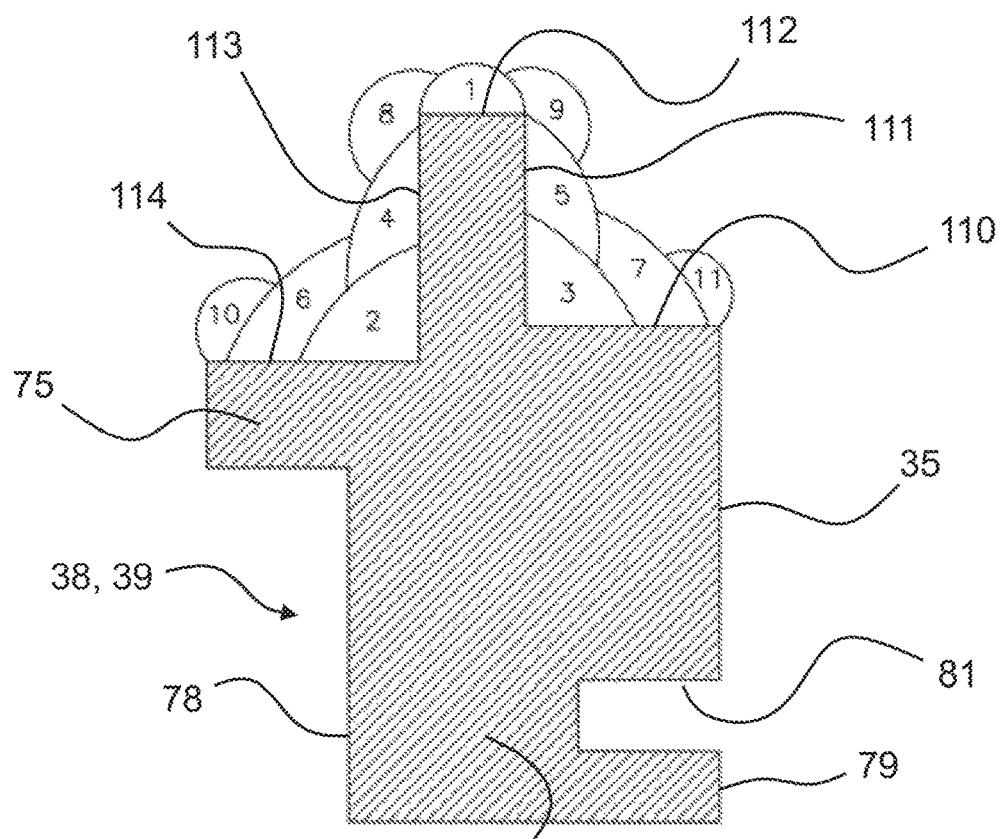
FIG. 6A to 6C show different stages of Cladding a worn diaphragm rail member in accordance with a first embodiment.
Figure 6B:
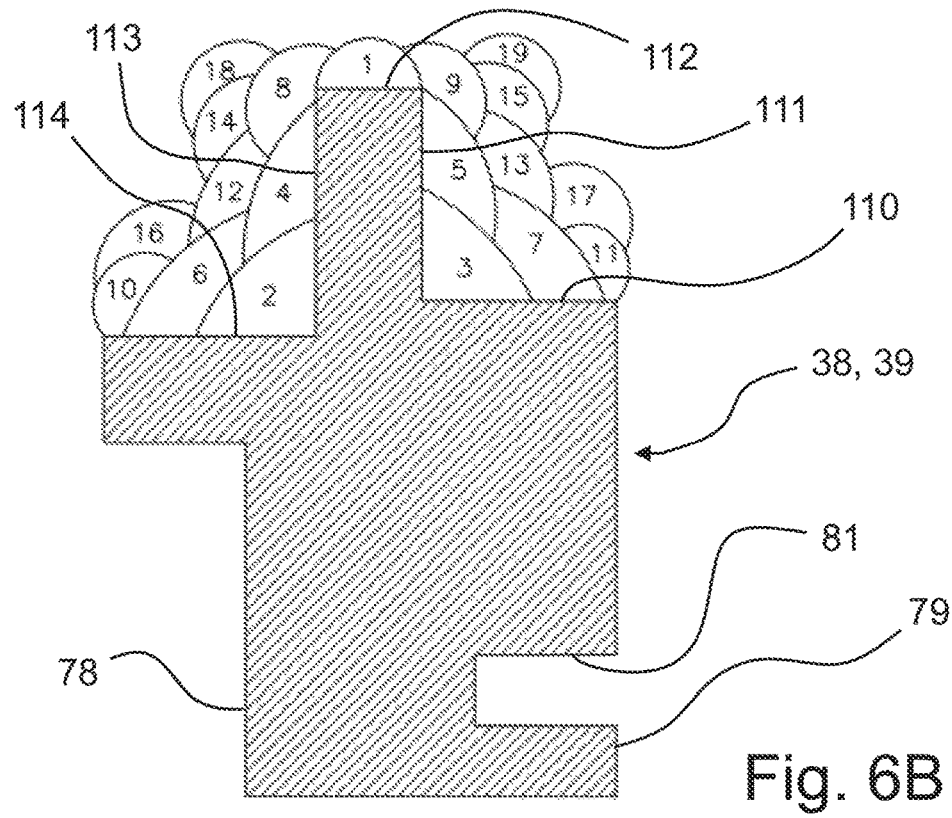
Figure 6C:
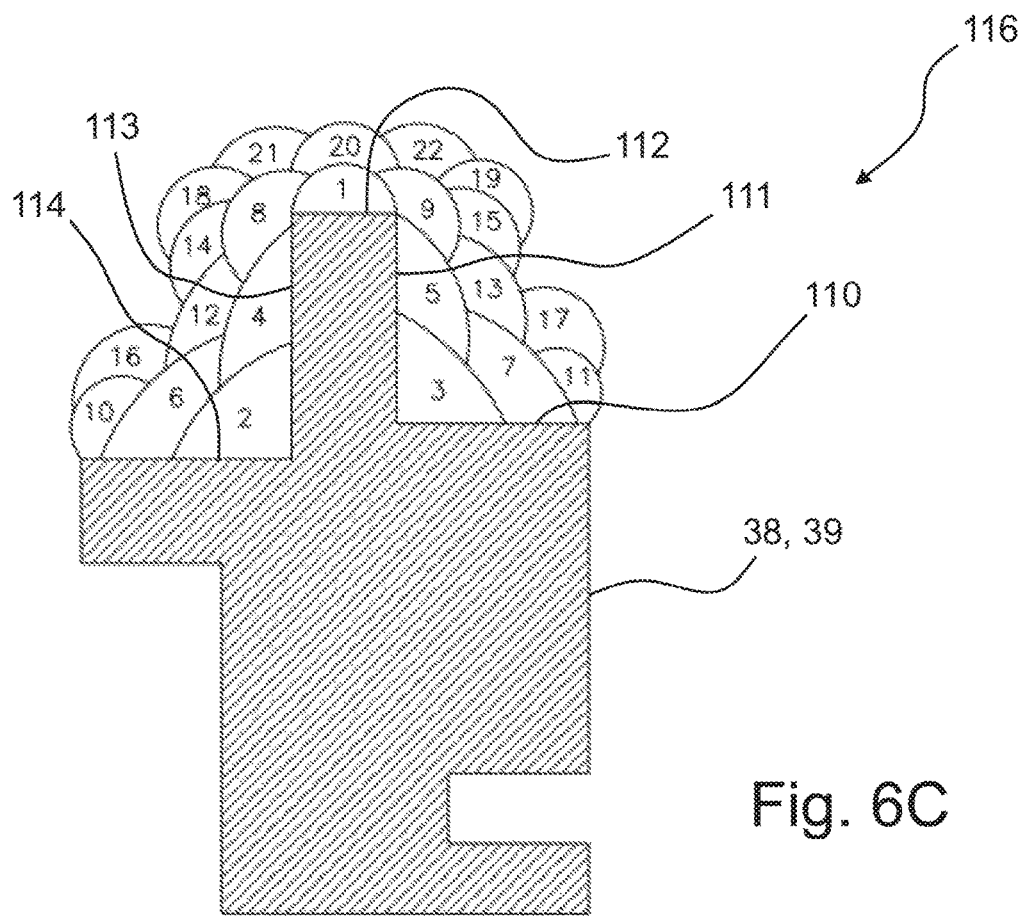

The FIGS. 6A, 6B and 6C illustrate the cross-sectional area of a worn diaphragm that has been machined according to FIG. 3. As can be seen from FIG. 6a the machined surfaces 110 to 114 make a more or less symmetric cross-sectional area. To reduce the thermal tensions to the diaphragm it is preferred if the weld passes are alternatingly welded on both sides of the axis of symmetry.

In this particular case, a first weld pass 1 is welded on the machined surface 112, which is the end of the machined contour. A second weld pass 2 is welded in the corner between the machined surfaces 114 and 113. A third weld pass 3 is welded in the corner between the machined surfaces 110 and 111. The sequence of the weld passes 1 to 22 can be seen from FIGS. 6a to 6c. Each weld pass has a number and this number describes the sequence of the welding passes welded to the diaphragm.

The most important welding parameters have been listed in the subsequent tables that are linked to each of the figures.

Very good results have been achieved using these welding parameters if the diaphragm is cast of nickel iron and the filler-material for welding the passes is an austenitic stainless steel. Appropriate stainless steel alloys are known under the tradenames 300 series and 312.

FIGS. 6A, 6B and 6C illustrate the process of cladding a machined surface of a diaphragm rail member. In this case a weld robot or a weld automat is used. The welding method is MIG/MAG. A TIG process may also be used for the repair process however different parameters are used in this case.

Cladding is achieved by welding several passes side by side. If necessary several layers of passes are welded to achieve the desired contour of the cladding. Up to ten layers have been welded in several applications.

In the FIGS. 6 and 7 the passes have been numbered and in the respective tables listed below the most important welding parameters (welding speed and welding angle) have been noted.

FIG. 6A (1-St Layer)

| Pass | welding angle |
|---|---|
| 1 | 0° |
| 2 | 45° (0 arc length correction) |
| 3 | 45° (0 arc length correction) |
| 4 | 67.5° |
| 5 | 67.5° |
| 6 | 22.5° |
| 7 | 22.5° |
| 8 | 90° |
| 9 | 90° |
| 10 | 22.5° |
| 11 | 22.5° |

The weld passes 1 to 11 results in a compact first layer of the cladding.

FIG. 6B (2-Nd Layer)

| Pass | welding angle |
|---|---|
| 12 | 45° (0 arc length correction) |
| 13 | 45° (0 arc length correction) |
| 14 | 67.5° |
| 15 | 67.5° |
| 16 | 22.5° |
| 17 | 22.5° |
| 18 | 90° |
| 19 | 90° |

The weld passes 12 to 19 results in a compact second layer of the cladding.

FIG. 6C (3-Rd Layer)

| Pass | welding angle |
|---|---|
| 20 | 0° |
| 21 | 0° |
| 22 | 0° |

The weld passes 20 to 22 results in a compact second layer of the cladding. The entirety of welding passes 1 to 22 forms the cladding 116.

FIG. 7 to G illustrate a further embodiment of the claimed method. The cladding generated in this embodiment comprises ten (10) layers.

Figure 7A:
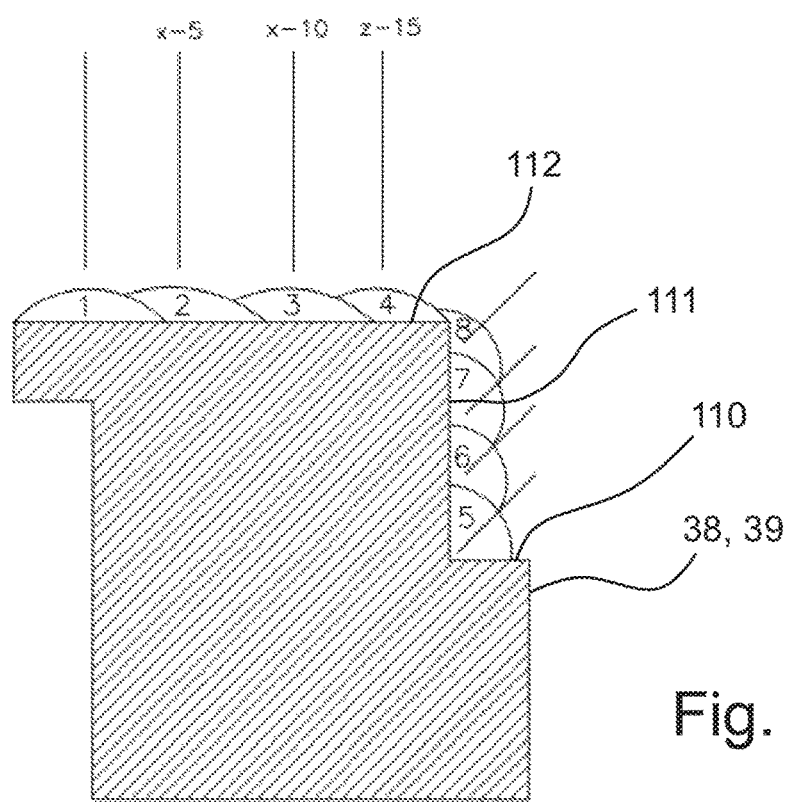
FIG. 7A to 7H show different stages of cladding a worn diaphragm rail member in accordance with a second embodiment.

FIG. 7A (1-St Layer)

| Pass | welding angle |
|---|---|
| 1 | 0° |
| 2 | 0° |
| 3 | 0° |
| 4 | 0° |
| 5 | 45° (0 arc length correction) |
| 6 | 45° |
| 7 | 45° |
| 8 | 45° |

Figure 7B:
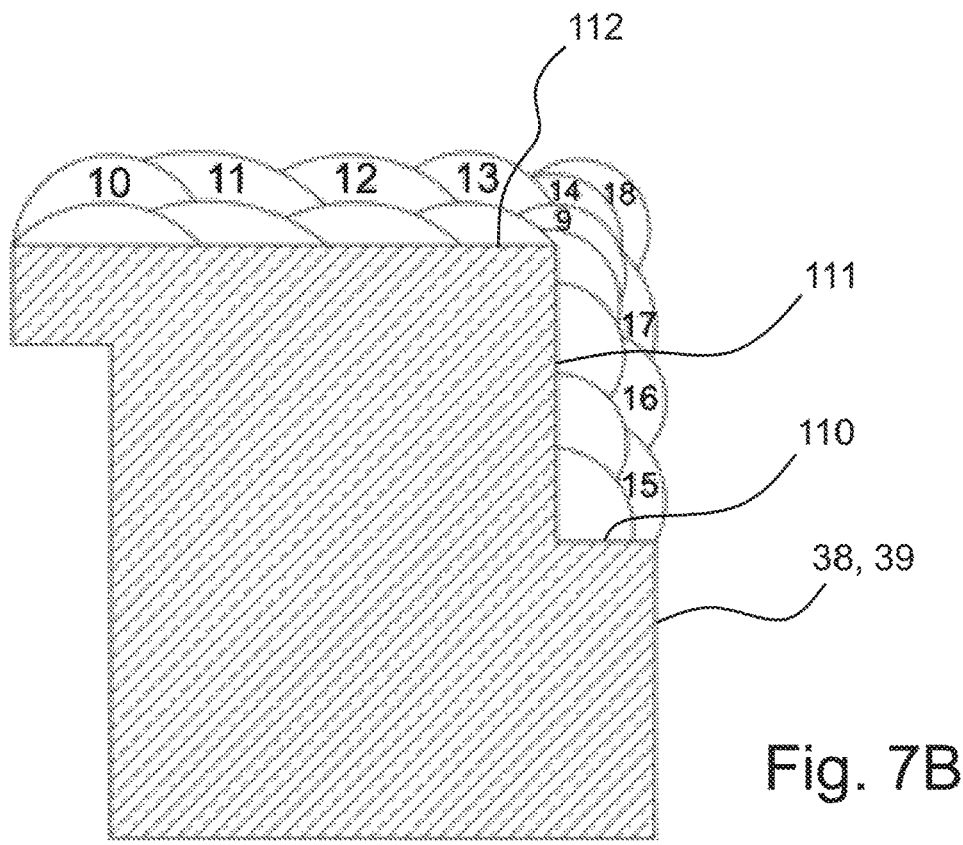

FIG. 7B (2-Nd Layer)

| Pass | welding angle |
|---|---|
| 9 | 45° (repeating No 8) |
| 10 | 0° |
| 11 | 0° |
| 12 | 0° (same as 1-4, offset +z 2-3 mm) |
| 13 | 0° |
| 14 | 0° |
| 15 | 90° |
| 16 | 90° |
| 17 | 90° |
| 18 | 0° (repeating No 14) |

Figure 7C:
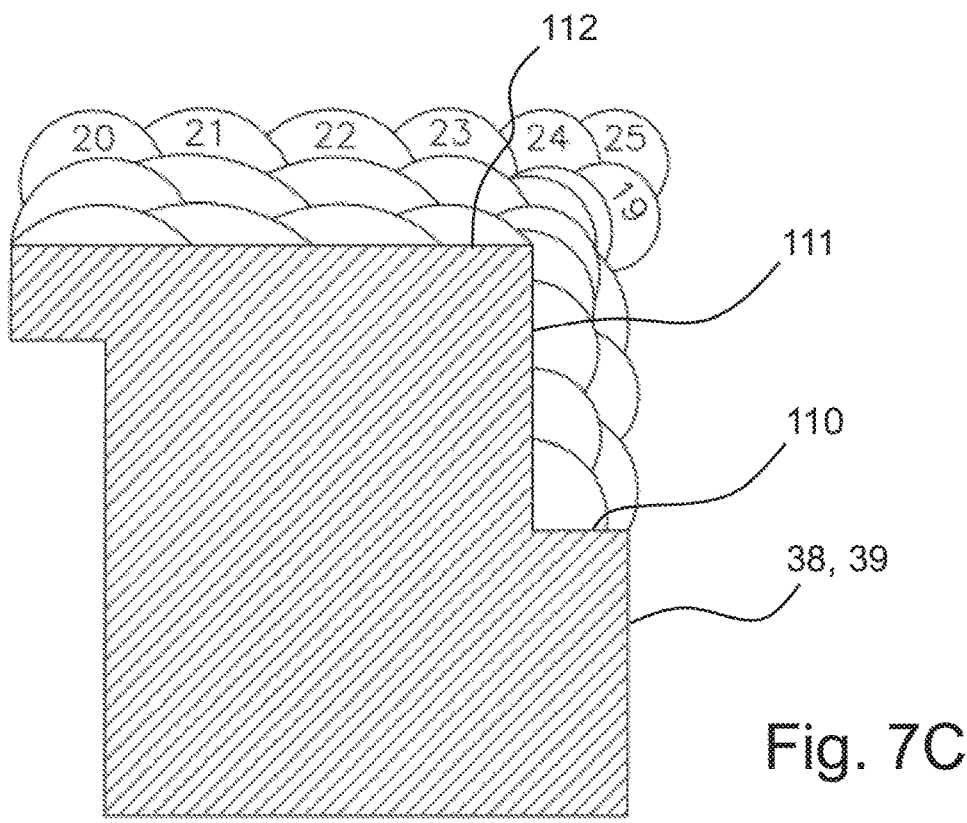

FIG. 7C (3-Rd Layer)

| Pass | welding angle |
|---|---|
| 19 | 45° (extra buildup-platform) |
| 20 | 0° |
| 21 | 0° |
| 22 | 0° |
| 23 | 0° (same setting on X axis as 1-4; offset +Z 4-6 mm) |

Figure 7D:
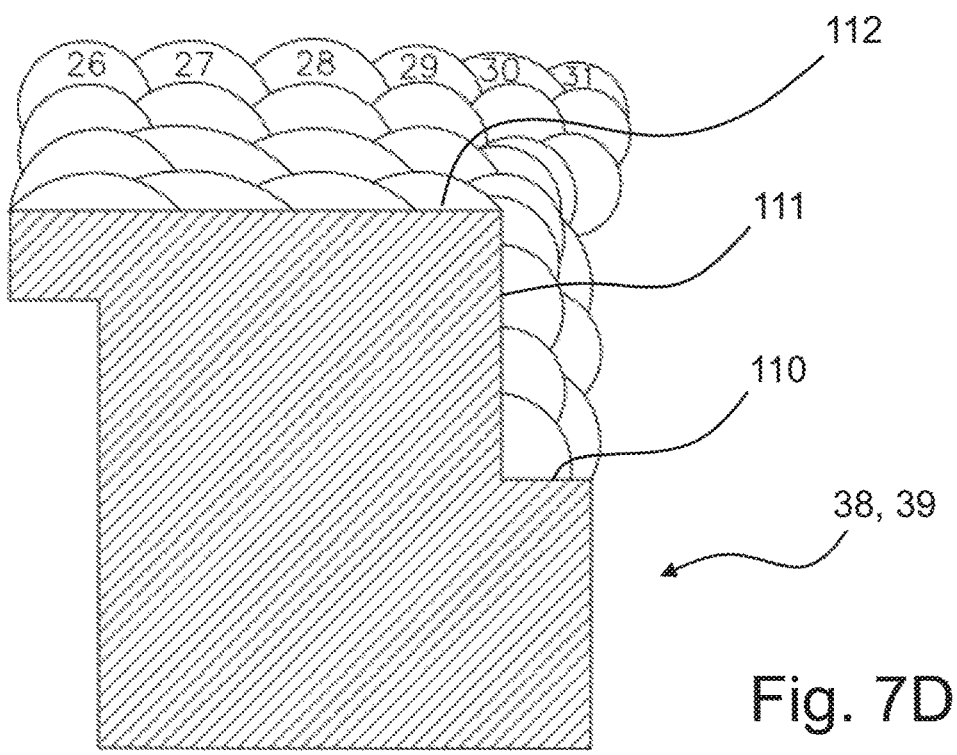

FIG. 7D (4-Th Layer) -continued

| Pass | welding angle |
|------|---------------|
| 24 | 0° |
| 25 | 0° |

Figure 7E:
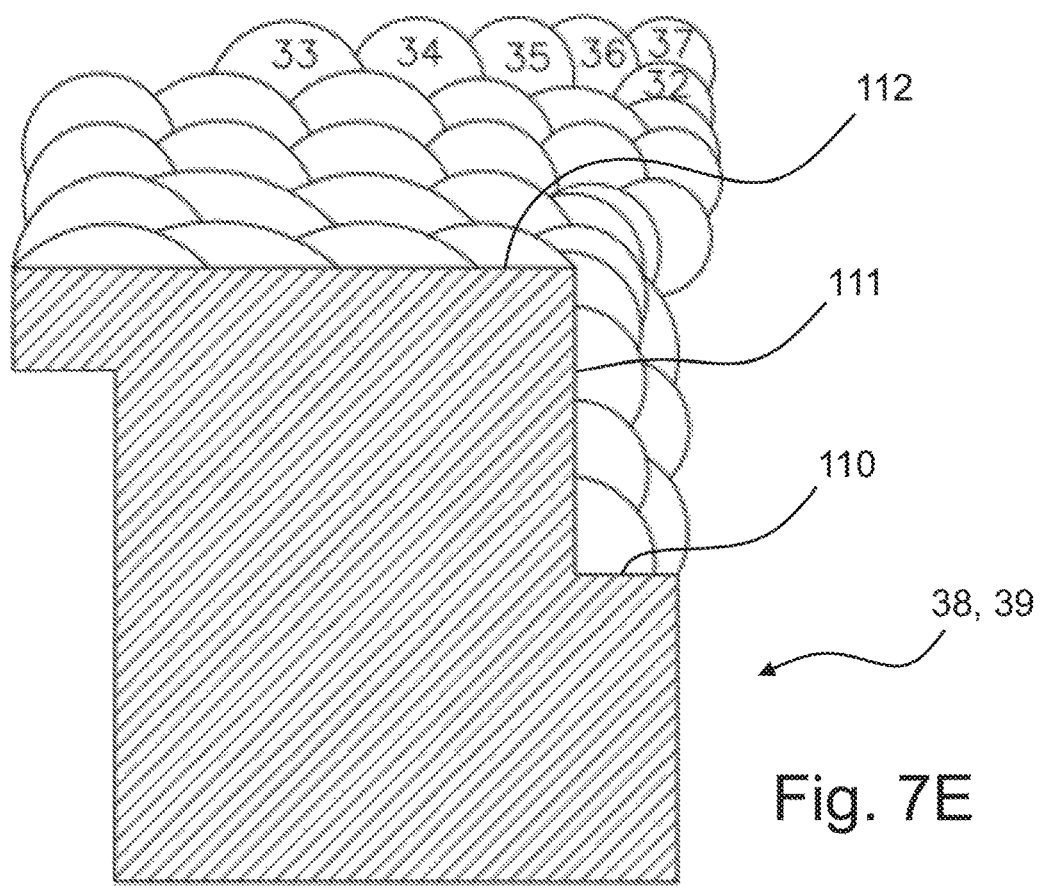

FIG. 7E (5-Th Layer)

| Pass | welding angle |
|------|---------------|
| 26 | 0° |
| 27 | 0° |
| 28 | 0° |
| 29 | 0° |
| 30 | 0° |
| 31 | 0° |

Figure 7F:
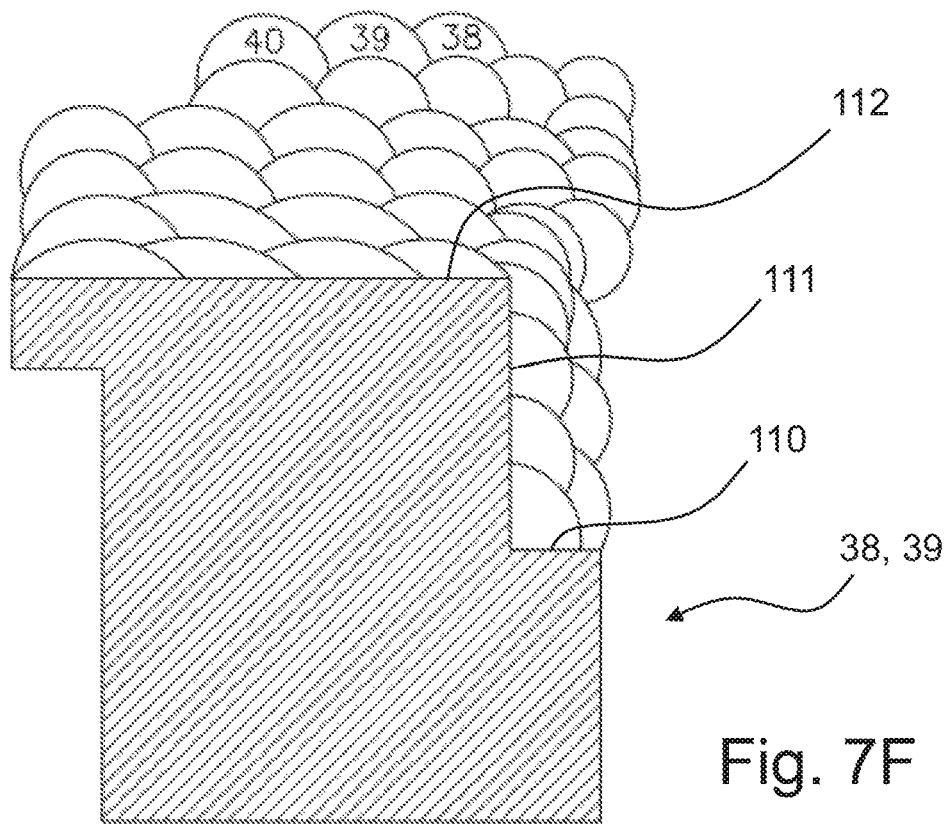

FIG. 7F (6-Th Layer)

| Pass | welding angle |
|------|---------------|
| 32 | 0° |
| 33 | 0° |
| 34 | 0° |
| 35 | 0° |
| 36 | 0° |
| 37 | 0° |

Figure 7G:
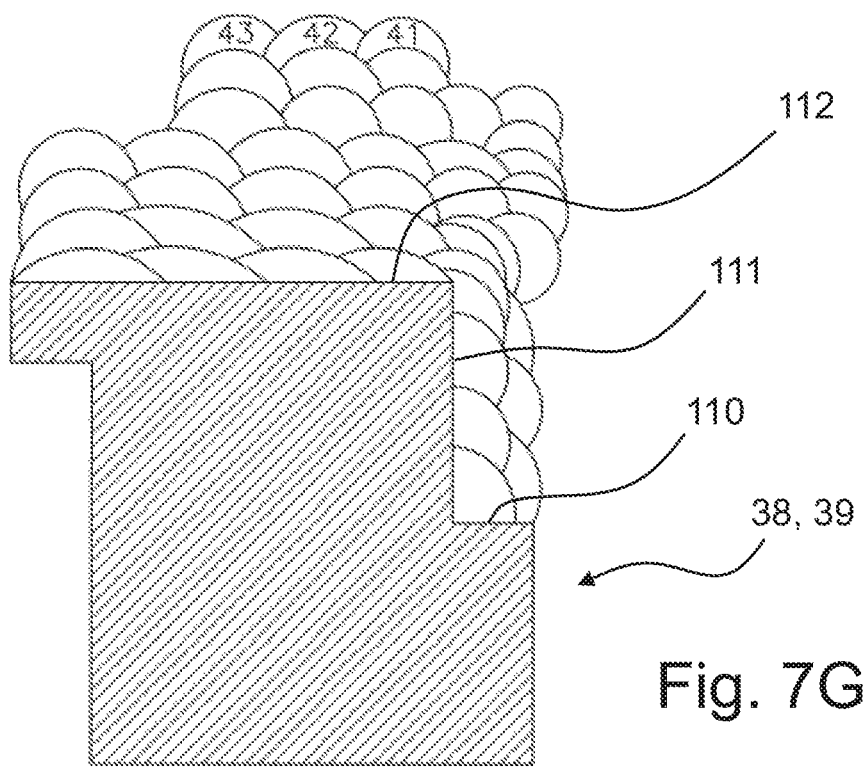

FIG. 7G (7-Th Layer)

| Pass | welding angle |
|------|---------------|
| 38 | 0° |
| 39 | 0° |
| 40 | 0° |

Figure 7H:
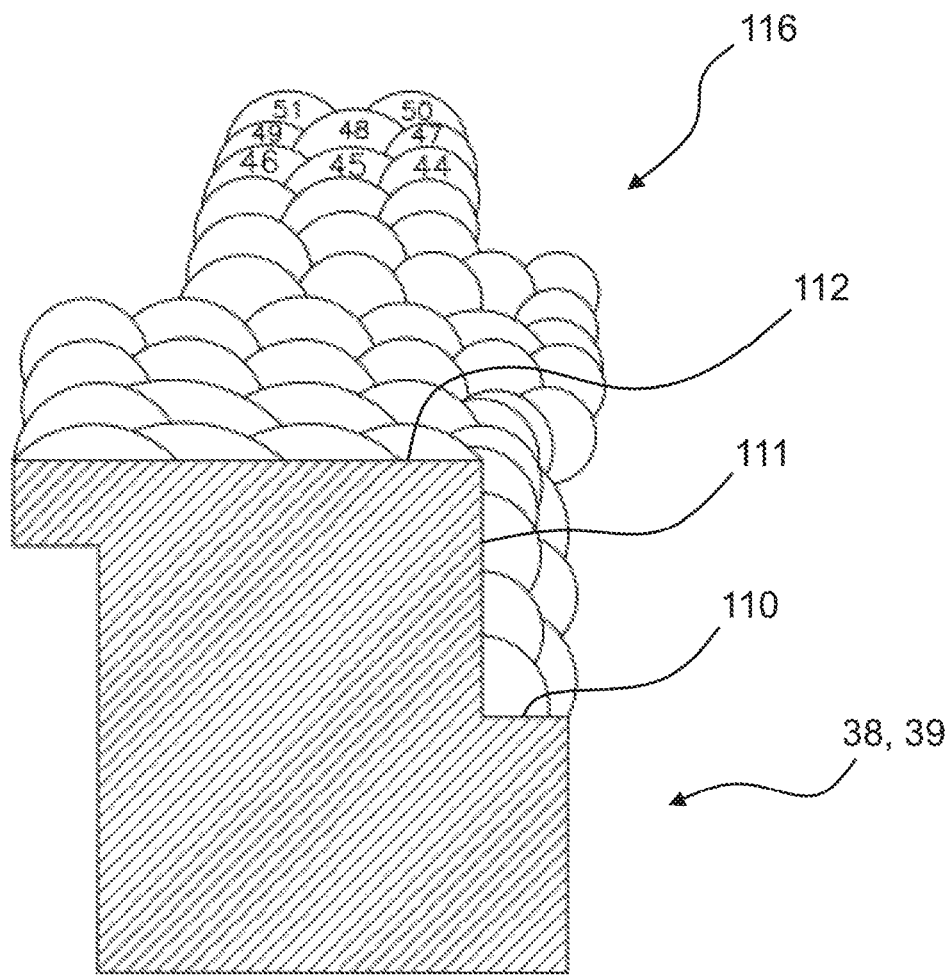

FIG. 7H (8-Th to 10-Th Layer)

| Pass | welding angle |
|------|---------------|
| 41 | 0° |
| 42 | 0° |
| 43 | 0° |

| Pass | welding angle |
|------|---------------|
| 44 | 0° |
| 45 | 0° |
| 46 | 0° |

9-Th Layer:

| Pass | welding angle |
|------|---------------|
| 47 | 0° |
| 48 | 0° |
| 49 | 0° |

10-Th Layer:

| Pass | welding angle |
|------|---------------|
| 50 | 0° |
| 51 | 0° |

The entirety of weld passes 1 to 51 forms the cladding 116.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of repairing a turbomachine diaphragm comprising of cast nickel-iron (Ni-resist), the method comprising:

machining a worn coupon of a diaphragm rail member;

forming at least one machined surface during the machining; and welding a cladding on the at least one machined surface using at least one of a weld robot or a welding machine, wherein the cladding comprises a stainless austenitic steel, and wherein welding a cladding on the at least one machined surface includes covering the at least one machined surface with at least one welding layer such that a surface of the cladding overtops the nominal dimensions of a new diaphragm, wherein covering the at least one machined surface with at least one welding layer includes welding several passes in close proximity to each other, wherein the first weld pass is at an end of the least one machined surface and each successive weld pass forms a new weld pass covering a portion of the previous weld pass and a portion of the at least one machined surface.

2. The method of claim 1, wherein for each pass the main weld parameters including at least one of current and voltage, wire feed speed are adapted accordingly.

3. The method of claim 1, wherein for each pass an angle between the welding nozzle and the machined surfaces is adapted.

4. The method of claim 1, wherein if the machined surfaces have a symmetric cross-sectional area, the passes are welded alternating on each side of an axis of symmetry.

5. The method of claim 1, wherein the cladding comprises more than one layer.

6. The method of claim 1, wherein welding comprises at least one of a MIG/MAG or a TIG welding process.

7. The method of claim 1, wherein welding is supported by an inert gas environment, wherein the inert gas environment comprises more than 90% argon (Ar) and 2.5% CO2.

8. The method of claim 1, comprising machining the cladding to the dimensions of a diaphragm.

9. A method of repairing a turbomachine diaphragm comprising of cast nickel-iron (Ni-resist), the method comprising:

machining a worn coupon from a diaphragm rail member;

forming a squared rail of the worn coupon with a plurality of machined surfaces during the machining, wherein a first machined surface is at a top of the squared rail, a second and a third machined surfaces is a side of the squared rail, and a fourth and a fifth machined surfaces is an opposite side of the squared rail; and welding a cladding on the machined surfaces using at least one of a weld robot or a welding machine, wherein the cladding comprises a stainless austenitic steel, and wherein welding a cladding on the machined surfaces includes covering the machined surfaces with at least one welding layer such that a surface of the cladding overtops the nominal dimensions of a new diaphragm, wherein covering the plurality of machined surfaces with at least one welding layer includes welding several passes in close proximity to each other, wherein a first weld pass is at an end of the coupon on the first machined surface, wherein a second weld pass is at first corner formed by the second machined surface and third machined surface, wherein a third weld pass is at second corner formed by the fourth machined surface and fifth machined surface.

10. The method of claim 9, wherein for each weld pass the main weld parameters including at least one of current and voltage, wire feed speed are adapted accordingly.

11. The method of claim 9, wherein the cladding comprises more than one layer.

12. The method of claim 9, comprising machining the cladding to the dimensions of a diaphragm.

13. The method of claim 9, wherein a fourth weld pass is between the first weld pass and the second weld pass.

14. The method of claim 13, wherein a fifth weld pass is between the first weld pass and the third weld pass.

* * * * *